(12) United States Patent
Bucko

(10) Patent No.: US 6,250,400 B1
(45) Date of Patent: Jun. 26, 2001

(54) JACKHAMMER CARRIER

(76) Inventor: Paul Bucko, 10 Fourth St., Rio Grande, NJ (US) 08242

( * ) Notice: Subject to any disclaimer, the term of this patent is extended or adjusted under 35 U.S.C. 154(b) by 0 days.

(21) Appl. No.: 09/436,335

(22) Filed: Nov. 8, 1999

(51) Int. Cl.⁷ .............................. B60R 7/00; B60R 11/00
(52) U.S. Cl. ...................... 173/184; 173/28; 173/29; 173/171; 211/70.6; 224/42.21; 224/42.38; 224/554; 224/571; 224/488; 248/689
(58) Field of Search ................................. 173/184, 29, 28, 173/31, 171, 185; 224/42.11, 42.31, 42.32, 42.21, 42.38, 545, 547, 548, 552, 554, 571, 403, 488, 320, 321, 324, 329; 211/175, 207, 208, 70.6; 248/311.2, 122.1, 121, 689, 682

(56) References Cited

U.S. PATENT DOCUMENTS

| | | | |
|---|---|---|---|
| 2,673,071 | * 3/1954 | Curtis et al. | 173/29 |
| 2,678,150 | 5/1954 | Lund . | |
| 3,172,583 | 3/1965 | Smith . | |
| 3,302,730 | * 2/1967 | Bellsmith | 173/28 |
| 3,705,632 | * 12/1972 | Burke | 173/28 |
| 3,806,010 | 4/1974 | Utigard . | |
| 4,189,074 | 2/1980 | Davies . | |
| 4,846,385 | 7/1989 | Fratus . | |
| 4,852,780 | 8/1989 | Woodbury . | |
| 4,936,531 | 6/1990 | Bauser . | |
| 4,998,590 | * 3/1991 | Wells | 173/29 |
| 5,558,169 | * 9/1996 | Madgwick et al. | 173/185 |
| 5,647,489 | 7/1997 | Bellis, Jr. . | |
| 6,035,948 | * 3/2000 | Griffin | 173/171 |

* cited by examiner

Primary Examiner—Scott A. Smith
(74) Attorney, Agent, or Firm—Norman E. Lehrer

(57) ABSTRACT

A carrier for a jackhammer which may be mounted to the tongue of an air compressor is disclosed. The carrier includes a support column, an adjustable bracket slideably mounted to the support column, and a pocket secured to the lower end of the support column for receiving the jackhammer. Mounted to the support column is an L-shaped bracket which may be secured to the tongue of an air compressor. The adjustable bracket includes a U-shaped member with two arms and a rear wall. The jackhammer is placed between the arms and an elongated rod is used to retain the jackhammer in place. The pocket has two converging walls which do not contact each other. An opening is formed between the bottoms of the two walls and a bar is placed within the opening. The bar is short enough in length so that the opening is not completely closed, thereby preventing rainwater or other precipitation from collecting within the pocket. Once the jackhammer has been placed within the carrier, the blade of the jackhammer rests on the bar. The L-shaped bracket is mounted to the support column at an angle, thereby causing the carrier to tilted rearwardly when it is mounted to the tongue. This position, in turn, causes the jackhammer to lean backwardly once it is placed within the carrier so that the jackhammer remains securely within the carrier.

6 Claims, 2 Drawing Sheets

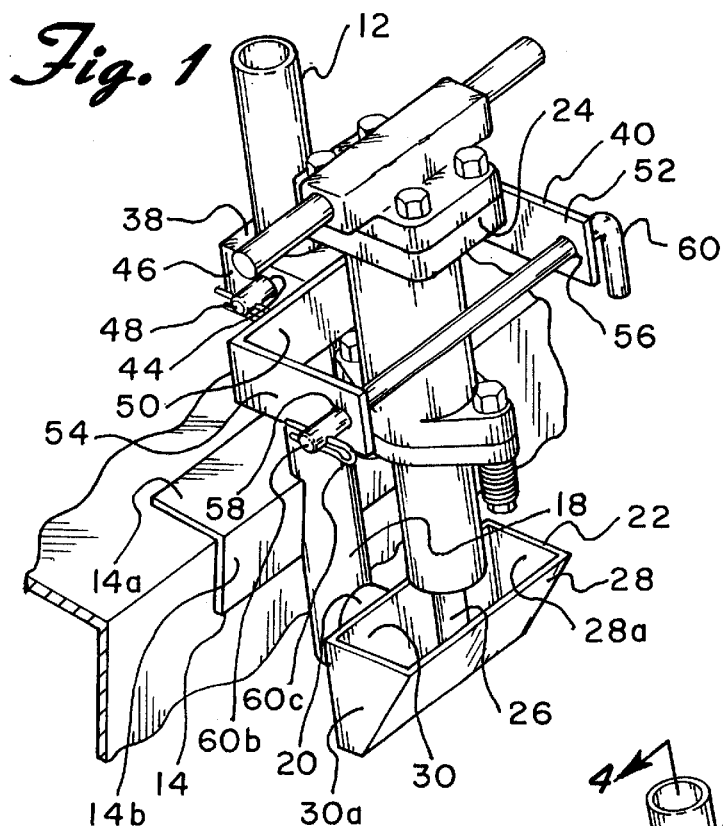
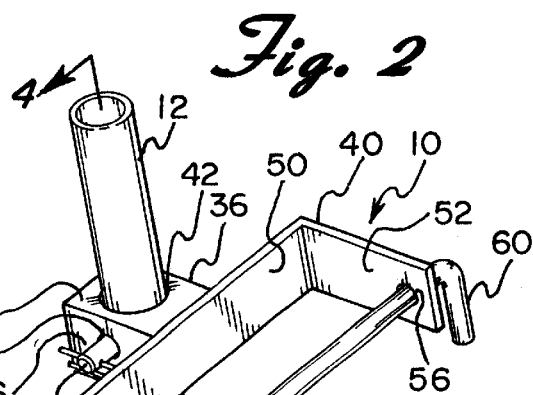
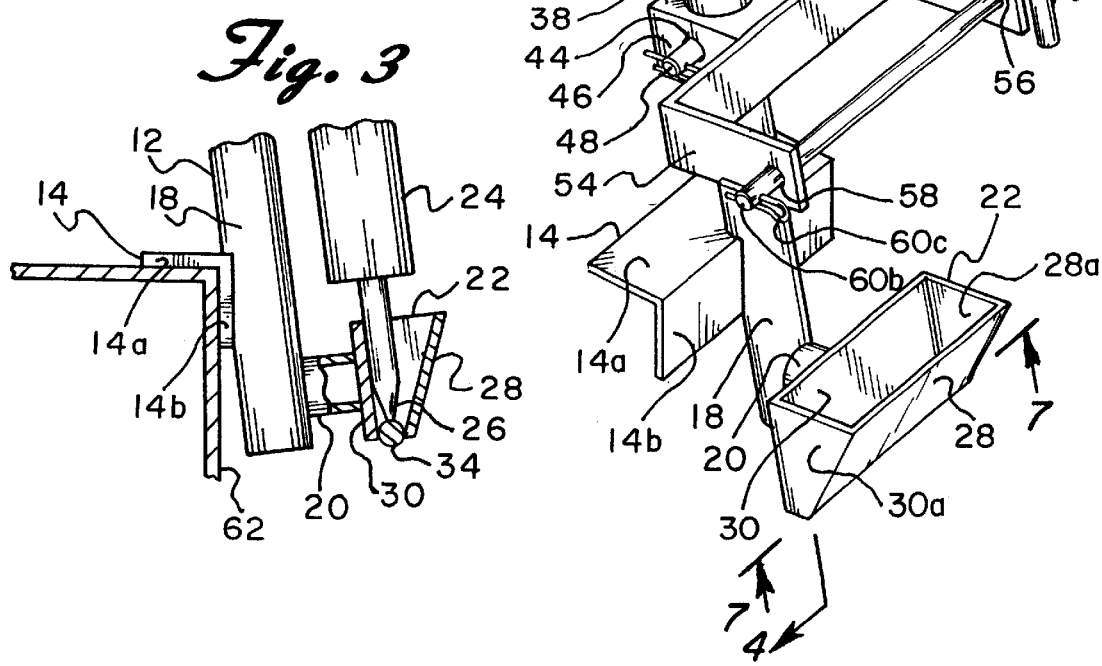

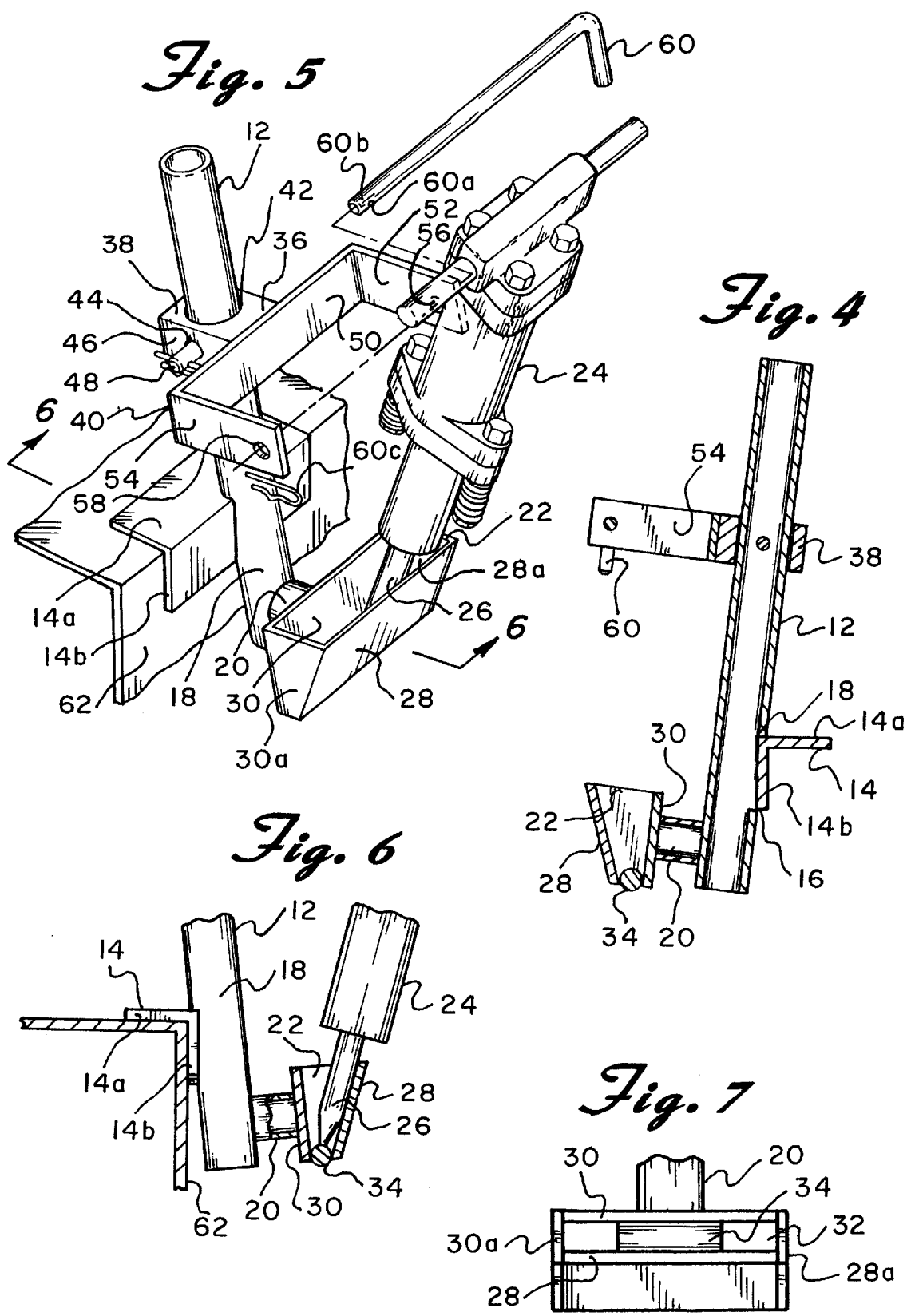

JACKHAMMER CARRIER

BACKGROUND OF THE INVENTION

The present invention is directed toward a carrier for a jackhammer or the like and more particularly, toward a carrier which may be mounted to a portion of the tongue of a trailer mounted air compressor.

Transporting a jackhammer from one location to another location as it is needed can be a strenuous and awkward task. That is, because of its size, weight, and bulkiness, one cannot easily store and secure a jackhammer for transportation. Furthermore, because the jackhammer may be needed frequently at a work site, it is necessary for it to be readily accessible to the worker without having to waste time and effort trying to remove it from its stored position.

There are several methods that are currently being used to transport jackhammers. For example, a worker may haul the jackhammer onto the bed of a truck. Also, the jackhammer may be fastened or otherwise tied to other equipment. A problem with laying the jackhammer on the bed of a truck is that it may not be held securely in place while it is being transported. As a result, damage may occur to the jackhammer. Also, because of the bulkiness of the jackhammer, it may not be easy to remove. Alternatively, the jackhammer may be held so securely when it is fastened to other equipment that it may become difficult to remove the jackhammer quickly and easily. Furthermore, releasing and removing the jackhammer may be time-consuming and require a great deal of effort.

In light of the current methods for transporting jackhammers, there is a need for a convenient and safe way to transport jackhammers. To Applicant's knowledge, no one has proposed an arrangement specifically designed to transport jackhammers.

SUMMARY OF THE INVENTION

The present invention is designed to overcome the deficiencies of the prior art discussed above. It is an object of the present invention to provide a carrier for a jackhammer which may be mounted to the tongue of a trailer mounted air compressor so that the jackhammer may be transported in an safe and convenient manner.

It is a further object of the present invention to provide holder for a jackhammer which is adjustable so that jackhammers of varying sizes may be held within the holder.

In accordance with the illustrative embodiments demonstrating features and advantages of the present invention, there is provided a carrier for a jackhammer or the like which includes a support column, an adjustable bracket slideably mounted to the support column, and a pocket secured to the lower end of the support column for receiving a jackhammer. Mounted to the support column is an L-shaped bracket which may be secured to the tongue of an air compressor. The adjustable bracket includes a U-shaped member with two arms and a rear wall. The jackhammer is placed between the arms and an elongated rod is used to retain the jackhammer in place. The pocket has two converging walls which do not contact each other. An opening is formed between the bottoms of the two walls and a bar is placed within the opening. Once the jackhammer has been placed within the carrier, the blade of the jackhammer rests on the bar. The L-shaped bracket is mounted to the support column at an angle, thereby causing the carrier to tilt slightly rearwardly when it is mounted to the tongue. This position, in turn, causes the jackhammer to lean backwardly once it is placed within the carrier so that the jackhammer remains securely within the carrier.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a top, front, and side perspective view of the carrier of the present invention attached to a tongue of an air compressor with a jackhammer located therein;

FIG. 2 is a perspective view of the carrier of the present invention without the jackhammer;

FIG. 3 is a partial cross-sectional view of the carrier of the present invention;

FIG. 4 is a cross-sectional view taken through line 4—4 of FIG. 2;

FIG. 5 is an exploded view of the carrier and a jackhammer placed therein illustrating the operation thereof;

FIG. 6 is a partial cross-sectional view taken through the line 6—6 of FIG. 5; and FIG. 7 is a cross-sectional view taken through line 7—7 of FIG. 2.

DETAILED DESCRIPTION OF THE PREFERRED EMBODIMENT

Referring now to the drawings in detail wherein like reference numerals have been used throughout the various figures to designate like elements, there is shown in FIG. 2 a carrier for a jackhammer constructed in accordance with the principles of the present invention and designated generally as 10.

The carrier 10 of the present invention essentially includes a substantially vertically extending support column which may be an elongated, hollow tubular member 12. It should be realized, however, that while the column is shown as a cylindrically shaped tubular member, it may be any elongated shape. Furthermore, the member 12 need not be tubular although this helps to reduce the weight of the carrier 10. Attached to the tubular member 12 is a securing or mounting means which may be in the form of an L-shaped bracket 14 with a substantially horizontally extending portion 14a and a substantially vertically extending portion 14b. (See FIG. 2.) A notch 16 is cut into the wall 18 of the tubular member 12 so that the bracket 14 is placed and secured within the wall 18 of the tubular member 12. (See FIG. 3.) The horizontally extending portion 14a of the L-shaped bracket extends at an angle of greater than 90 degrees from the axis of the tubular member 12, thereby enabling the carrier to lean slightly backwardly or rearwardly. (See FIG. 4.) At the bottom of the elongated tubular member 12 is a smaller tubular member 20 which is welded or otherwise fastened to the tubular member 12 and extends outwardly or forwardly therefrom. Attached to the forward end of member 20 is a pocket 22 or means for receiving a jackhammer 24 and in particular, the blade 26 of the jackhammer 24. The pocket 22 directly supports the weight of the jackhammer 24 and includes walls 28, 28a, 30, and 30a with front wall 28 and back wall 30 converging. Wall 28 angles outwardly from the carrier so that the jackhammer 24 may be placed within the pocket 22 easily. (See FIG. 5.) At the point of convergence, a space or opening 32 is formed so that the two walls 28 and 30 do not actually contact each other. (See FIG. 7.) A bar 34 is placed within the space 32 so that the blade 26 rests thereon. (See FIG. 6.) The bar 34 contacts and is supported by walls 28 and 30 yet is short enough in length so that the space 32 is not completely closed. (See FIG. 7.) Therefore, the pocket 22 has a substantially open bottom in order to prevent rainwater or other precipitation from collecting within the pocket 22.

Slideably mounted to the tubular member 12 is an adjustable bracket 36. The bracket 36 includes a hollow block 38 to which is attached a forwardly extending U-shaped member 40. The block 38 has a central aperture 42 and is mounted to the tubular member 12 through the aperture 42. The block 38 also has holes in the sidewalls, seen, for example, as hole 44 in sidewall 46. A pin or bolt 48 is inserted through the holes and can be used to adjust the height of the bracket 36. That is, the bolt or pin 48 is removed from the holes so that the block 38 can be mounted on the tubular member 12. Once the block 38 is mounted to any position desired on the tubular member 12, the bolt 48 is replaced and secured to the tubular member 12. The tubular member 12 may have a series of holes through which the bolt 48 may pass through so that the bracket 36 may be positioned at the desired height on the tubular member 12. Alternatively, the bolt may be threaded into the block 38 to engage the tubular member 12 so as to secure the block 38 at substantially any position therealong.

The U-shaped member 40 includes a rear wall 50 and two arms 52 and 54 extending forwardly from the ends thereof. (See FIG. 5.) Holes 56 and 58 are formed in the arms 52 and 54, respectively, so that locking means, such as a rod 60, may be inserted through the holes 56 and 58. Rod 60 has a hole 60a at end 60b thereof through which a pin 60c may be inserted in order to keep the rod 60 in place. The block 38 and member 40 may be formed as a single piece or as two separate pieces welded or otherwise secured together. Also, while a rod is shown, it may be replaced with other types of securing means known in the art, for example, an elongated bolt.

In order to use the carrier 10, the L-shaped bracket 14 is secured to the horizontal and vertical walls of the tongue 62 of a trailer mounted air compressor. (See FIG. 1.) With the adjustable bracket 36 adjusted to a desired height on the tubular member 12, the rod 60 is removed from the U-shaped member 40 and the blade 26 of the jackhammer 24 is placed within the pocket 22. (See FIG. 5.) The blade 26 rests on the bar 34 at an angle as seen in FIG. 6. The jackhammer 24 is stable in this position. The jackhammer 24 is then moved towards the rear wall 50 so that the rod 60 can be replaced through holes 56 and 58 and the pin 60c can be inserted through hole 60a, thereby locking the jackhammer 24 in a generally upright position. That is, the jackhammer 24 is secured between the rear wall 50 of the member 40 and the rod 60, with the blade 26 resting on the bar 34 so that the jackhammer is in a substantially vertical position. (See FIG. 6.) However, as described above, the L-shaped bracket 14 is secured to the tubular member 12 at a slight angle so that when the jackhammer 24 is placed within the carrier, it leans slightly in a backward direction. This position retains the jackhammer 24 even when the rod 60 is removed.

In order to remove the jackhammer from the carrier, a person stands in front of the carrier so that the pin 60c can be removed. Next, the rod 60 is removed. The jackhammer 24 can now be shifted toward the person so that the person can lift the jackhammer 24 out of the pocket 22.

The component parts of the carrier may be made from iron, steel, or the like. Also, the size and shape of each of the brackets and the support column may be varied in order to accommodate various types and sizes of jackhammers. The various components are preferably welded together although it is obviously possible to combine them using any conventional means.

The present invention may be embodied in other specific forms without departing from the spirit or essential attributes thereof and accordingly, reference should be made to the appended claims rather than to the foregoing specification as indicating the scope of the invention.

I claim:

1. A carrier for a jackhammer comprising:
   a substantially vertically extending support column having an upper end and a lower end;
   an adjustable bracket slideably mounted to said support column so as to be movable along at least a portion of the length of said support column adjacent the upper end thereof, said bracket extending forwardly of said support column;
   means for fixing said adjustable bracket to said support column at a plurality of different positions;
   a pocket secured to said support column adjacent the lower end thereof and extending forwardly of said column, said pocket being adapted to receive the blade of a jackhammer therein, said pocket having at least a partially open bottom, and
   mounting means secured to the said support column on the rear side thereof at a location between said upper and lower ends, said mounting means being adapted to mount said support column to a horizontal surface whereby said support column leans rearwardly.

2. The carrier for a jackhammer as claimed in claim 1 wherein said mounting means is comprised of an L-bracket including a substantially vertical portion and a substantially horizontally extending portion.

3. The carrier for a jackhammer as claimed in claim 2 wherein said horizontally extending portion of said L-bracket extends at an angle of greater than 90 degrees from the axis of said support column.

4. The carrier for a jackhammer as claimed in claim 1 wherein said adjustable bracket includes a U-shaped member with two arms connected by a wall and means for locking the jackhammer within said member.

5. The carrier for a jackhammer as claimed in claim 4 wherein said locking means includes a hole formed in each of said arms and a rod inserted through both of said holes.

6. The carrier for a jackhammer as claimed in claim 1 wherein said pocket includes front and back converging walls.

* * * * *